US008755834B2

(12) United States Patent
Väisänen et al.

(10) Patent No.: US 8,755,834 B2
(45) Date of Patent: *Jun. 17, 2014

(54) METHOD AND ARRANGEMENT FOR TRANSMITTING AND RECEIVING RF SIGNALS THROUGH VARIOUS RADIO INTERFACES OF COMMUNICATION SYSTEMS

(75) Inventors: Risto Väisänen, Salo (FI); Kim Kaltiokallio, Salo (FI)

(73) Assignee: Nokia Corporation, Espoo (FI)

( * ) Notice: Subject to any disclaimer, the term of this patent is extended or adjusted under 35 U.S.C. 154(b) by 39 days.

This patent is subject to a terminal disclaimer.

(21) Appl. No.: 13/614,272

(22) Filed: Sep. 13, 2012

(65) Prior Publication Data
US 2013/0012142 A1 Jan. 10, 2013

Related U.S. Application Data

(63) Continuation of application No. 12/136,465, filed on Jun. 10, 2008, which is a continuation of application No. 09/856,746, filed as application No. PCT/FI99/00974 on Nov. 25, 1999, now Pat. No. 7,415,247.

(30) Foreign Application Priority Data

Nov. 26, 1998 (FI) .......................................... 982559

(51) Int. Cl.
*H04M 1/00* (2006.01)
*H04B 1/40* (2006.01)
(52) U.S. Cl.
CPC ...................................... *H04B 1/406* (2013.01)
USPC ......................................... 455/552.1; 455/91
(58) Field of Classification Search
CPC .......... H04B 1/406; H04B 1/001; H04B 1/38; H04B 1/16; H04B 1/405; H04B 1/40; H04B 1/005; H04B 1/48; H04B 1/44; H04B 1/525; H04B 1/18; H04B 1/28; H04B 1/408; H04B 17/0012; H04B 17/004; H04B 17/0057; H04B 1/0007; H04B 1/0057; H04B 1/0067; H04B 1/3805; H04B 1/707; H04B 2001/0416; H04B 2001/0491; H04B 7/0413; H04B 1/0014; H03D 7/163; H04L 1/0026; H04L 1/0009; H04L 1/0003; H04L 1/20; H04W 24/00; H04W 40/246; H04W 84/18; H04W 8/005; H04W 12/06; H04W 36/0094; H04W 36/14; H04M 1/7253; H04M 2250/02
USPC ............................................ 455/552.1–553.1
See application file for complete search history.

(56) References Cited

U.S. PATENT DOCUMENTS 4,395,776 A 7/1983 Naito et al.
4,731,796 A 3/1988 Masterton
(Continued)

FOREIGN PATENT DOCUMENTS

CN 1148444 4/1997
CN 1187270 7/1998
(Continued)

OTHER PUBLICATIONS

Abidi, "Direct Conversion Radio Transceivers for Digital Communications", Dept. of Electr. Eng., California Univer., Los Angeles, CA, Journal, publication date Dec. 1995, vol. 30, No. 12.

(Continued)

*Primary Examiner* — Lana N Le
(74) *Attorney, Agent, or Firm* — Banner & Witcoff, Ltd.

(57) ABSTRACT

A method and arrangement for transmitting and receiving RF signals, associated with different radio interfaces of communication systems, employ a direct conversion based transceiver which substantially comprises one receive signal branch and one transmit signal branch. Mixing frequencies of the different systems are generated by a single common by use of an output frequency divider in combination with the synthesizer, and by use of filtering corresponding to a system channel bandwidth by means of a controllable low-pass filter operating at baseband frequency.

81 Claims, 2 Drawing Sheets

(56) References Cited

U.S. PATENT DOCUMENTS

Figure 1:
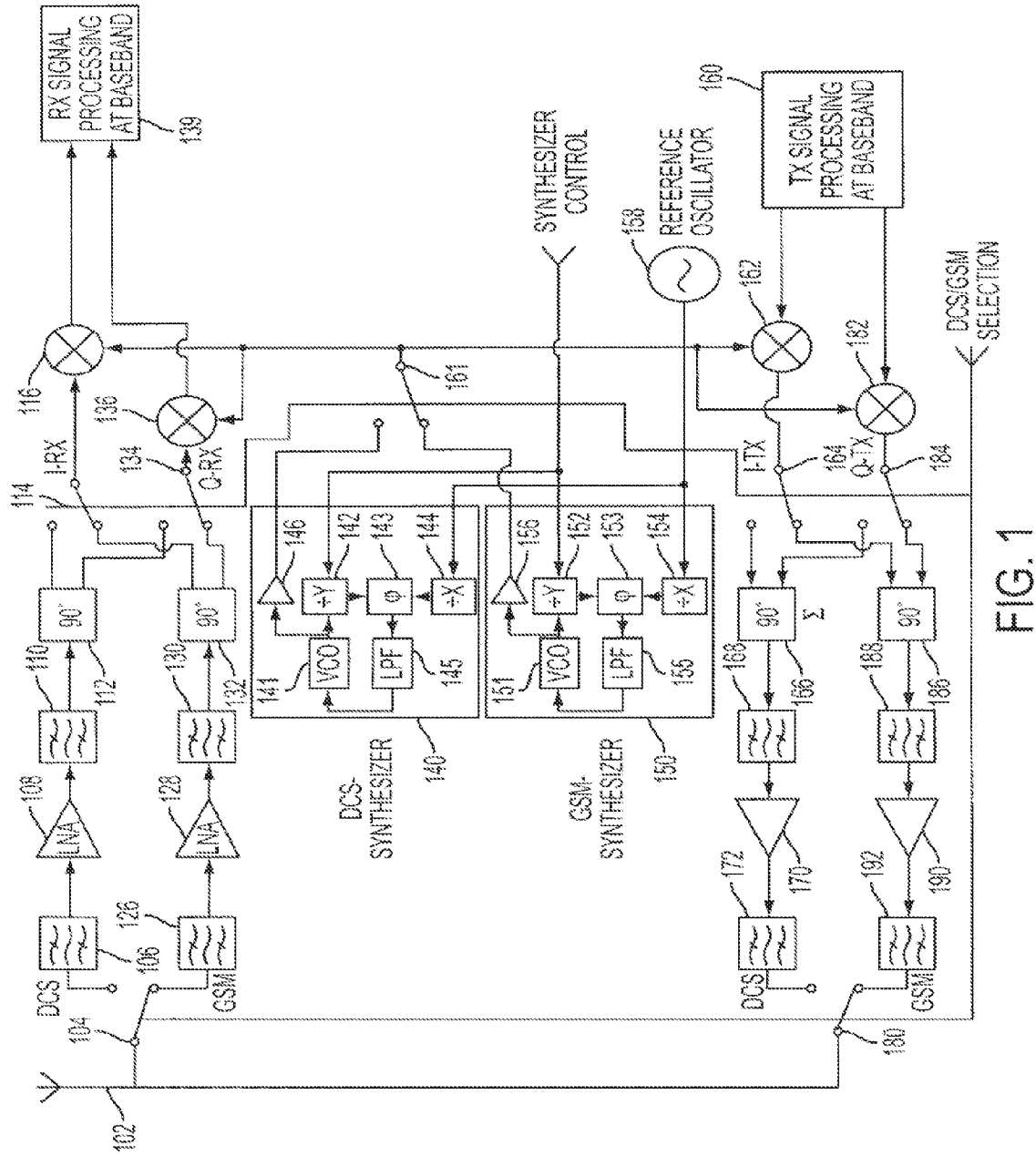

| Patent No. | | Date | Inventor |
|---|---|---|---|
| 4,736,390 | A | 4/1988 | Ward |
| 4,761,798 | A | 8/1988 | Griswold, Jr. |
| 4,972,455 | A | 11/1990 | Phillips et al. |
| 5,187,809 | A | 2/1993 | Rich |
| 5,438,692 | A | 8/1995 | Mohindra |
| 5,465,409 | A | 11/1995 | Borras et al. |
| 5,483,691 | A | 1/1996 | Heck et al. |
| 5,511,235 | A | 4/1996 | Duong et al. |
| 5,519,885 | A | 5/1996 | Vaisanan |
| 5,548,825 | A | 8/1996 | Maemura et al. |
| 5,557,642 | A | 9/1996 | Williams |
| 5,564,076 | A * | 10/1996 | Auvray .......................... 455/76 |
| 5,574,985 | A | 11/1996 | Ylikotila |
| 5,584,068 | A | 12/1996 | Mohindra |
| 5,590,412 | A | 12/1996 | Sawai et al. |
| 5,642,378 | A | 6/1997 | Denheyer et al. |
| 5,694,414 | A | 12/1997 | Smith et al. |
| 5,710,998 | A | 1/1998 | Opas |
| 5,722,053 | A | 2/1998 | Kornfeld |
| 5,732,330 | A | 3/1998 | Anderson |
| 5,734,970 | A | 3/1998 | Saito |
| 5,751,249 | A | 5/1998 | Baltus et al. |
| 5,752,169 | A | 5/1998 | Hareyama et al. |
| 5,757,858 | A | 5/1998 | Black et al. |
| 5,758,266 | A | 5/1998 | Kornfeld et al. |
| 5,758,271 | A | 5/1998 | Rich et al. |
| 5,786,782 | A | 7/1998 | Ostman et al. |
| 5,794,119 | A | 8/1998 | Evans et al. |
| 5,794,159 | A | 8/1998 | Portin |
| 5,796,772 | A | 8/1998 | Smith et al. |
| 5,822,366 | A | 10/1998 | Rapeli |
| 5,825,809 | A | 10/1998 | Sim |
| 5,872,810 | A | 2/1999 | Philips et al. |
| 5,894,592 | A | 4/1999 | Brueske et al. |
| 5,896,562 | A | 4/1999 | Heinonen |
| 5,909,643 | A | 6/1999 | Aihara |
| 5,926,749 | A | 7/1999 | Igarashi et al. |
| 5,926,750 | A | 7/1999 | Ishii |
| 5,953,641 | A * | 9/1999 | Auvray .......................... 455/74 |
| 5,955,992 | A | 9/1999 | Shattil |
| 5,963,852 | A | 10/1999 | Schlang et al. |
| 5,983,081 | A | 11/1999 | Lehtinen |
| 6,006,080 | A | 12/1999 | Kato |
| 6,009,126 | A | 12/1999 | Van Bezooijen |
| 6,014,571 | A | 1/2000 | Enoki |
| 6,018,553 | A | 1/2000 | Sanielevici et al. |
| 6,029,052 | A | 2/2000 | Isberg et al. |
| 6,029,058 | A | 2/2000 | Namgoong et al. |
| 6,049,722 | A | 4/2000 | Umemoto et al. |
| 6,054,887 | A | 4/2000 | Horie et al. |
| 6,075,996 | A | 6/2000 | Srinivas |
| 6,081,697 | A | 6/2000 | Haartsen |
| 6,085,075 | A | 7/2000 | Van Bezooijen |
| 6,125,268 | A | 9/2000 | Boesch et al. |
| 6,134,452 | A | 10/2000 | Hufford et al. |
| 6,151,354 | A | 11/2000 | Abbey |
| 6,163,710 | A | 12/2000 | Blaser et al. |
| 6,167,245 | A | 12/2000 | Welland et al. |
| 6,169,733 | B1 * | 1/2001 | Lee .......................... 455/552.1 |
| 6,175,746 | B1 | 1/2001 | Nakayama |
| 6,188,877 | B1 | 2/2001 | Boesch |
| 6,194,947 | B1 | 2/2001 | Lee et al. |
| 6,208,875 | B1 | 3/2001 | Damgaard et al. |
| 6,215,988 | B1 | 4/2001 | Matero |
| 6,243,569 | B1 | 6/2001 | Atkinson |
| 6,256,511 | B1 | 7/2001 | Brown et al. |
| 6,269,253 | B1 | 7/2001 | Maegawa et al. |
| 6,278,864 | B1 | 8/2001 | Cummins et al. |
| 6,282,184 | B1 | 8/2001 | Lehman et al. |
| 6,298,226 | B1 | 10/2001 | Lloyd et al. |
| 6,308,050 | B1 | 10/2001 | Eklof |
| 6,337,976 | B1 | 1/2002 | Kodou |
| 6,356,746 | B1 | 3/2002 | Katayama |
| 6,366,765 | B1 | 4/2002 | Hongo et al. |
| 6,411,646 | B1 | 6/2002 | Walley et al. |
| 6,415,001 | B1 | 7/2002 | Li |
| 6,434,401 | B1 | 8/2002 | Recouly |
| 6,438,462 | B1 | 8/2002 | Hanf et al. |
| 6,449,264 | B1 | 9/2002 | Lehtinen et al. |
| 6,484,038 | B1 | 11/2002 | Gore et al. |
| 6,510,310 | B1 | 1/2003 | Muralidharan |
| 6,516,023 | B1 | 2/2003 | Kveim et al. |
| 6,535,499 | B1 * | 3/2003 | Futamura et al. .......... 455/552.1 |
| 6,535,561 | B2 | 3/2003 | Boesch et al. |
| 6,535,748 | B1 | 3/2003 | Vuorio et al. |
| 6,584,090 | B1 | 6/2003 | Abdelgany |
| 6,584,305 | B1 | 6/2003 | Ohta et al. |
| 6,600,911 | B1 | 7/2003 | Morishige et al. |
| 6,697,606 | B1 | 2/2004 | Wagemans et al. |
| 6,813,485 | B2 | 11/2004 | Sorrells et al. |
| 6,954,624 | B2 | 10/2005 | Hamalainen |
| 7,065,327 | B1 | 6/2006 | Macnally et al. |
| 7,415,247 | B1 | 8/2008 | Vaisanen et al. |

FOREIGN PATENT DOCUMENTS

| | | |
|---|---|---|
| DE | 19712161 A1 | 9/1998 |
| DE | 69735156 T2 | 8/2006 |
| DE | 69736793 T2 | 2/2007 |
| DE | 69737000 T2 | 7/2007 |
| EP | 0581572 | 2/1994 |
| EP | 0581573 A1 | 2/1994 |
| EP | 0599409 | 6/1994 |
| EP | 0631400 | 6/1994 |
| EP | 0633674 | 1/1995 |
| EP | 0653851 | 5/1995 |
| EP | 0798880 | 1/1997 |
| EP | 0782358 | 2/1997 |
| EP | 0797311 | 9/1997 |
| EP | 0800283 | 10/1997 |
| EP | 0809366 | 11/1997 |
| EP | 0813312 | 12/1997 |
| EP | 0823788 | 2/1998 |
| EP | 0878974 | 11/1998 |
| GB | 2287144 | 9/1995 |
| GB | 2312107 A | 10/1997 |
| GB | 2312108 | 10/1997 |
| JP | 10065749 | 3/1989 |
| JP | 05075495 | 3/1993 |
| JP | 07059162 | 3/1995 |
| JP | 9130275 | 5/1997 |
| JP | 09275358 | 10/1997 |
| JP | 09-312578 | 12/1997 |
| JP | 10032520 | 2/1998 |
| JP | 10093475 | 4/1998 |
| JP | 10224250 | 8/1998 |
| WO | 9221195 | 11/1992 |
| WO | 9706604 | 2/1997 |
| WO | 9853625 | 11/1998 |
| WO | 9901933 | 1/1999 |
| WO | 9917445 | 4/1999 |

OTHER PUBLICATIONS

Gray, et al., "Future Directions in Silicon ICS for RF Personal Communications", Dept. of Electr. Eng. & Comput. Sci., California University, Berkely, CA, publication date May 14, 1995, pp. 83-90.

Behzad Razavi, RF Microelectronics, 1998, Prentice Halls, Inc., 10th Edition, pp. 150-153.

Proof of Publication date (Nov. 6, 1997) of book Razavi, Behzad, RF Microelectronics, Prentice Hall, 1st Edition by amazon.com under product detail section, and paper of when it was received by USPTO (Nov. 23, 1998).

Weidong, et al., "Software Radio: Technology & Implementation", ICCT'98, Oct. 22, 1998.

UK Revocation Action, *HTC Corporation v. Nokia Corporation*, Claim No. He12F02047 issued May 17, 2012, 50 pages.

U.S. District Court, District of Delaware (Wilmington), Civil Docket for Case #: 1:12-cv-00549-LPS, *Nokia Corporation et al v. HTC Corporation et al*, Jul. 2, 2012, 2 pages.

U.S. International Trade Commission, Docket Report of 337-TA-847, found at <https://edis.usitc.gov/edis3-external/direct.svc>, 8 pages, Jul. 2, 2012.

(56) References Cited

OTHER PUBLICATIONS

HTC Corporation and Nokia Corporation, Grounds of Invalidity, Claim No. HC12 F02047, executed May 17, 2012, 2 pages.
Hanusch, T., et al., "Analog Baseband-IC for Dual Mode Direct Conversion receiver", Proc. ESSCIRC., Sep. 1996, pp. 244-249.
Fernandez-Duran, A., et al., "Zero-IF Receiver Architecture for Multistandard Compatible Radio Systems. GIRAFE Project", IEEE 1996, pp. 1052-1056.
Nguyen, C.T.-C., "Communications Applications of Microelectromechanical Systems", Proceedings, 1998 Sensors Expo, May 19-21, 1998, pp. 447-455.
Tham, J.L., et al., "A Direct-Conversion Transceiver Chip Set for 900 MHz (ISM Band) Spread-Spectrum Digital Cordless Telephone", ISCAS 1996 Conference, May 12-15, vol. 4, 1996, pp. 85-88.
Kuo, C., "Multi-Standard DSP Based Wireless System", ICSP'98 Conference, vol. II of II, Oct. 12-16, 1998, pp. 1712-1728.
Beckwith, B., "Dual Band Integrated Power Amplifier with Switchable Interstage Match", Motorola, Jun. 1997, pp. 84-85.
Tham, J.L., e t al., "A 2.7V 900MHz/1.96GHz Dual-Band Transceiver IC for Digital Wireless Communication", IEEE CICC 1998 Conference, pp. 559-569.
B. Gilbert, "A Precise Four-Quadrant Multiplier with Subnanosecond Response," IEEE Journal Solid-State Circuits, Dec. 1968.
Sergio Graffi, et al., "New Macromodels and Measurements for the Analysis of EMI Effects in 741 Op-Amp Circuits," IEEE Trans. on Electromagnetic Compatiblity, Feb. 1991.
Nullity Complaint *HTC Europe Co. Ltd.* v. *Nokia Corporation* Re: EP1133831 (DE69942878.5), dated Jan. 17, 2013, with English translation, 59 pages.
DE Response to Nullity Action as filed, dated Oct. 7, 2013, with English translation, 91 pages.
Translation Statement of Defence Regional Court Dusseldorf, Hogan Lovells, dated Jan. 18, 2013, 41 pages.
Replik LG Dusseldorf, dated Jun. 7, 2013, with English translation, 71 pages.
Summons to Appear Before the Tribunal De Grande Instance de Paris, Sep. 2013, with English translation, 134 pages.
Expert Report of James Arthur Crawford, HTC Corporation and Nokia Corporation, executed Jul. 24, 2013, 86 pages.
Final Expert Report of Professor Bram Nauta (Patents and Prior Art), HTC Corporation and Nokia Corporation, executed Jul. 5, 2013, 106 pages.
Final Reply Report of Professor Bram Nauta (Patents and Prior Art), HTC Corporation and Nokia Corporation, executed Jul. 25, 2013, 18 pages.
Grounds of Invalidity, HTC Corporation and Nokia Corporation, executed May 17, 2012, 2 pages.
Document HTC115, HTC Europe Co. Ltd./Nokia Corporation, dated Jan. 17, 2013, 30 pages (HL4).
Document HTC115, HTC Europe Co. Ltd./Nokia Corporation, dated Nov. 15, 2013, 36 pages (HL24).
International Organisation for Standardisation Organisation Interntionale de Normalisation, ISO/IEC JTC/SC29/WG11, Coding of Moving Pictures and Associated Audio, N0801, Information Technology—Generic Coding of Moving Pictures and Associated Audio: Systems, Recommendation H.222.0, ISO/IEC 13818-1, draft of 1540 Sun Nov. 13, 1994, 161 pages.
Document, Samson & Partner, HTC Europe Co. Ltd. and Nokia Corporation, dated Oct. 7, 2013, 47 pages, German language (K94).
Defendant/Counteraction Claimant's Response to Claimant/Counteraction Defendant's Notice to Admit Facts dated Mar. 27, 2013, HTC Corporation and Nokia Corporation, 9 pages.
RF Case/Case 1, HTC's Statements of Case on Validity on EP(UK) 0 998 024 and EP(UK) 1 133 831, HTC Corporation and Nokia Corporation, 6 pages, executed Jan. 14, 2013.
Public Version of Initial Determination on Violation of Section 337 and Recommended Determination on Remedy and Bond, In the Matter of Certain Electronic Devices, Including Mobile Phones and Tablet Computers, and Components, Thereof, Investion No. 337-TA-847, dated Sep. 23, 2013, 239 pages.
Order No. 9: Errata, In the Matter of Certain Electronic Devices, Including Mobile Phones and Tablet Computers, and Components Thereof, Investigation No. 337-TA-847, dated Mar. 25, 2013, 3 pages.
Order No. 8: Construing Terms of the Asserted Patents, In the Matter of Certain Electronic Devices, Including Mobile Phones and Tablet Computers, and Components Thereof, Investigation No. 337-TA-847, dated Mar. 21, 2013, 84 pages.
Respondents HTC Corp. and HTC America, Inc's Opening Claim Construction Brief, Investigation No. 337-TA-847, executed Dec. 20, 2012, 63 pages.
Complainant's Nokia Corporation, Nokia Inc., and Intellisync Corporation Opening Claim Construction Brief, Investigation No. 337-TA-847, executed Dec. 20, 2012, 106 pages.
Respondents HTC Corp. and HTC America, Inc.'s Responsive Claim Construction Brief, Investigation No. 337-TA-847, executed Jan. 8, 2013, 42 pages.
Complainants' Nokia Corporation, Nokia Inc., and Intellisync Corporation Responsive Claim Construction Brief, Investigation No. 337-TA-847, executed Jan. 8, 2013, 48 pages.
Complainants' Nokia Corporation, Nokia Inc., and Intellisync Corporation Post-Markman-Hearing Brief, Investigation No. 337-TA-847, executed Feb. 13, 2013, 49 pages.
Respondents HTC Corp. and HTC America, Inc's Supplemental Claim Construction Brief, Investigation No. 337-TA-847, executed Feb. 13, 2013, 43 pages.
HTC Reply with English Translation dated Nov. 15, 2013, 71 pages.
Complaint, HTC with English translation, dated May 2, 2012, 92 pages.
MC1496 Datasheet, Motorola, Balanced Modulators/Demodulators, 1996, 12 pages.
Rejoinder EP1133831 B1, *Bird & Bird LLP* v. *Hogan Lovells International LLP*, document dated Nov. 15, 2013, 87 pages.

\* cited by examiner

METHOD AND ARRANGEMENT FOR TRANSMITTING AND RECEIVING RF SIGNALS THROUGH VARIOUS RADIO INTERFACES OF COMMUNICATION SYSTEMS

CROSS-REFERENCE TO RELATED APPLICATIONS

This application is a continuation of U.S. application Ser. No. 12/136,465, filed on Jun. 10, 2008, which is a continuation of U.S. application Ser. No. 09/856,746 filed May 24, 2001, now U.S. Pat. No. 7,415,247 which is a U.S. national stage of PCT/FI99/00974, filed on Nov. 25, 1999, which is based on and claims priority to Finnish application no. 982559, filed on Nov. 26, 1998, all incorporated by reference herein.

The invention relates to a method and arrangement for transmitting and receiving RF signals associated with various radio interfaces of communication systems. The invention finds particular utility in transceivers of general-purpose mobile stations.

Mobile communication systems are developing and expanding rapidly which has led to a situation in which there are in many areas systems complying with several different standards. This has brought about a need for mobile stations that can be used in more than one system. Good examples are the digital systems called GSM (Global System for Mobile communications) and DCS (Digital Cellular System), which operate on different frequency bands but have otherwise similar radio interfaces. In addition, the modulation, multiplexing and coding schemes used may be different. The systems mentioned above use the time division multiple access (TDMA) method; other methods include the frequency division multiple access (FDMA) and code division multiple access (CDMA).

One possible way of making a mobile station capable of operating in multiple systems is to have in the mobile station completely separate signal paths for each system. This, however, would lead to an unreasonable increase in the mobile station size and manufacturing costs. Therefore, the goal is to design a mobile station in which the differences relating to the radio interfaces of the various systems could be largely dealt with by means of programming, instead of having separate signal processing paths.

It is known e.g. from patent application document EP 653851 a transceiver arrangement using one local oscillator the frequency of which falls between the lower operating frequency band and the higher operating frequency band such that one and the same intermediate frequency (IF) can be used for both operating frequency bands. However, the disadvantage of such a solution is that the necessary IF stages make the implementation rather complex, and the manufacturing costs of the device will be high because of the great number of components. Furthermore, the IF stages require filters in order to eliminate spurious responses and spurious emissions. In addition, channel filtering at the intermediate frequency sets great demands on the IF filters.

In a direct-conversion, or zero-IF, receiver the radio-frequency (RF) signal is directly converted into baseband without any intermediate frequencies. Since no IF stages are needed, the receiver requires only a few components, therefore being an advantageous solution for general-purpose mobile stations which have multiple signal branches for different systems. To aid in understanding the problems relating to the direct conversion technique and prior art it is next described in more detail a prior-art solution.

FIG. 1 shows a direct conversion based arrangement for realizing a dual frequency band transceiver, known from the Finnish Patent document FI 100286. Depending on the receive frequency band, a RF signal received by an antenna is coupled by means of switch 104 either to a first receive branch (DCS) or second receive branch (GSM).

If the received signal is in the DCS frequency band, it is conducted to band-pass filter 106, low-noise amplifier (LNA) 108 and bandpass filter 110. After that the signal is brought to block 112 which produces signal components having a 90-degree phase difference. The in-phase component I and quadrature component Q are further conducted by means of switches 114 and 134 to mixers 116 and 136. The mixers get their mixing signals from a DCS synthesizer 140 the frequency of which corresponds to the received carrier frequency so that the mixing produces the in-phase and quadrature components of the complex baseband signal. The baseband signal is further processed in the receive (RX) signal processing unit, block 139.

If the signal received is a USM signal, switch 104 directs the received signal to the GSM branch which comprises, connected in series bandpass filter 126, low-noise amplifier 128, bandpass filter 130 and phase shifter 132 which generates two signals with a mutual phase difference of 90 degrees. The signals are further conducted by means of switches 114 and 134 to mixers 116 and 136 where the mixing frequency is now determined by a signal coming from the GSM synthesizer 150 via switch 161. The signals produced by the mixers are further conducted to the baseband RX signal processing unit 139.

The DCS synthesizer comprises in a known manner a phase-locked loop (PLL) which includes a voltage-controlled oscillator (VCO) 141 the output signal of which is amplified at amplifier 146 thus producing the synthesizer output signal. The frequency of the signal from oscillator 141 is divided by an integer Y in divider 142 and the resulting signal is conducted to phase comparator 143. Similarly, the frequency of the signal generated by reference oscillator 158 is divided by an integer X in divider 144 and conducted to phase comparator 143. The phase comparator produces a signal proportional to the phase difference of said two input signals, which signal is conducted to a low-pass filter (LPF) 145 producing a filtered signal that controls the voltage-controlled oscillator 141 The phase-locked loop described above operates in a known manner in which the output frequency of the synthesizer becomes locked to the frequency coming to the phase comparator from the reference frequency branch. The output frequency is controlled by varying the divisor Y.

The GSM synthesizer 150 comprises a voltage-controlled oscillator 150, amplifier 156, dividers 152 and 154, phase comparator 153 and a low-pass filter 155. The GSM synthesizer operates like the DCS synthesizer described above, but the output frequency of the GSM synthesizer corresponds to GSM frequency bands.

In the transmitter part, a baseband complex transmit (TX) signal is processed in a TX signal processing unit wherefrom the in-phase and quadrature components of the signal are conducted to mixers 162 and 182 that produce a carrier-frequency signal by multiplying the input signal by the mixing signal. If the transmission is at the DCS frequency, switch 161 selects the DCS synthesizer's output signal as the mixing signal. The carrier-frequency signal is conducted through switch 164 to the DCS branch where a 90-degree phase shift is first produced between the in-phase component and quadrature component, and the resulting signals are then summed, block 166. The resulting DCS signal is conducted to bandpass filter 168, amplifier 170, and bandpass filter 172. The RF signal thus produced is further conducted to the antenna 102 via switch 180.

If the transmission is at the GSM frequency, the output signal of the GSM synthesizer is used as the mixing signal. The resulting carrier-frequency signal is conducted to the GSM branch in which it is processed in the same manner as in the DCS branch blocks 186, 188, 190 and 192. The RF signal thus produced is conducted to the antenna 102 via switch 180. One and the same antenna 102 can be used in both transmission and reception if the TX and RX circuits are coupled to the antenna through a duplex filter, for example. If the apparatus is designed to operate in two or more frequency bands, it needs separate filters for each frequency band.

The circuit arrangement described above has, however, some disadvantages. First, separate carrier-frequency signal branches in the receiver and m the transmitter add to the complexity, size and manufacturing costs of the transceiver. Second, each operating frequency band needs a separate synthesizer of its own.

An object of the invention is to provide a simple solution for realizing a programmable transceiver operating in a plurality of systems in such a manner that the aforementioned disadvantages related to the prior art can be avoided.

In the direct conversion based transceiver according to the invention signal processing can be performed using one and the same signal processing line regardless of the system. This is achieved using the signal processing steps set forth below.

The method according to the invention for processing signals received from different radio interfaces of communication systems is characterized in that it comprises steps in which a carrier-frequency signal is received from a radio interface,
the carrier-frequency signal is bandpass-filtered,
the filtered carrier-frequency signal is amplified,
an RX mixing signal at the receive frequency is generated,
a complex baseband signal is generated from the received carrier-frequency signal by mixing it with the RX mixing signal,
the baseband signal generated is low-pass-filtered,
the baseband signal generated is amplified,
the baseband signal is converted digital, and
the baseband signal converted digital is processed to produce an information signal encoded and modulated into the received signal.

The method according to the invention for processing signals transmitted to different radio interfaces of communication systems is characterized in that it comprises steps in which a digital baseband quadrature signal is generated on the basis of the information signal to be transmitted,
the digital baseband signal is converted analog,
a TX mixing signal at the transmit frequency is generated,
a carrier-frequency transmission signal is generated from the baseband signal by mixing it with the TX mixing signal,
the carrier-frequency signal generated is amplified, and
the transmission signal is sent to the radio interface.

The direct-conversion receiver according to the invention operating at different interfaces of communication systems is characterized in that it comprises antenna means for receiving a radio-frequency signal,
bandpass filter for filtering a carrier-frequency signal,
first RX amplifier for amplifying the filtered carrier-frequency signal,
means for generating an RX mixing signal at the receive frequency,
mixing means for generating a complex baseband signal from the received signal using the RX mixing signal,
low-pass filter for filtering the baseband signal,
second amplifier for amplifying the baseband signal,
analog-to-digital converter for converting the baseband signal digital, and
means for processing the baseband signal converted digital to produce an information signal encoded and modulated into the received signal.

The direct-conversion transmitter according to the invention operating at different radio interfaces of communication systems is characterized in that it comprises means for generating a digital baseband quadrature signal on the basis of the information signal to be transmitted,
digital-to-analog converter for converting the baseband transmission signal analog,
synthesizer for generating a TX mixing signal at the transmit frequency, mixing means for producing a signal at the carrier frequency from the baseband transmission signal using the TX mixing signal,
TX amplifier for amplifying the signal at the carrier frequency, and
antenna means for transmitting the amplified transmission signal at the carrier frequency.

Other preferred embodiments of the invention are described in the dependent claims.

In the present invention, signal band limiting is advantageously performed at the baseband frequency so that there is no need for "steep" filters and, therefore, system-specific filter lines. Filtering can thus be performed as low-pass filtering using a filter with a controllable cut-off frequency. This way, it is possible to completely avoid separate system-specific channel filtering circuits.

To enable the generation of mixing frequencies of the different operating frequency bands by one and the same synthesizer it is advantageously used frequency division of the synthesizer output signal. If the synthesizer's operating frequency is set higher than the frequencies used in the systems, it is possible to generate, in conjunction with the synthesizer frequency division, two mixing signals with a 90-degree phase difference, thus avoiding the need for phase shifters on the signal line and achieving a good phase accuracy.

Using the solution according to the invention it is possible to realize a general-purpose transceiver which is considerably simpler and more economical to manufacture than prior-art solutions. The circuit arrangement according to the invention requires only one TX signal branch and one RX signal branch. Moreover, one and the same synthesizer may be used to generate the mixing signals. Furthermore, there is no need for channel filters operating at the radio frequency. Therefore, the circuitry can be easily integrated. Since the invention involves only a few components, the advantages of the transceiver according to the invention include small size and low power consumption.

Figure 2:
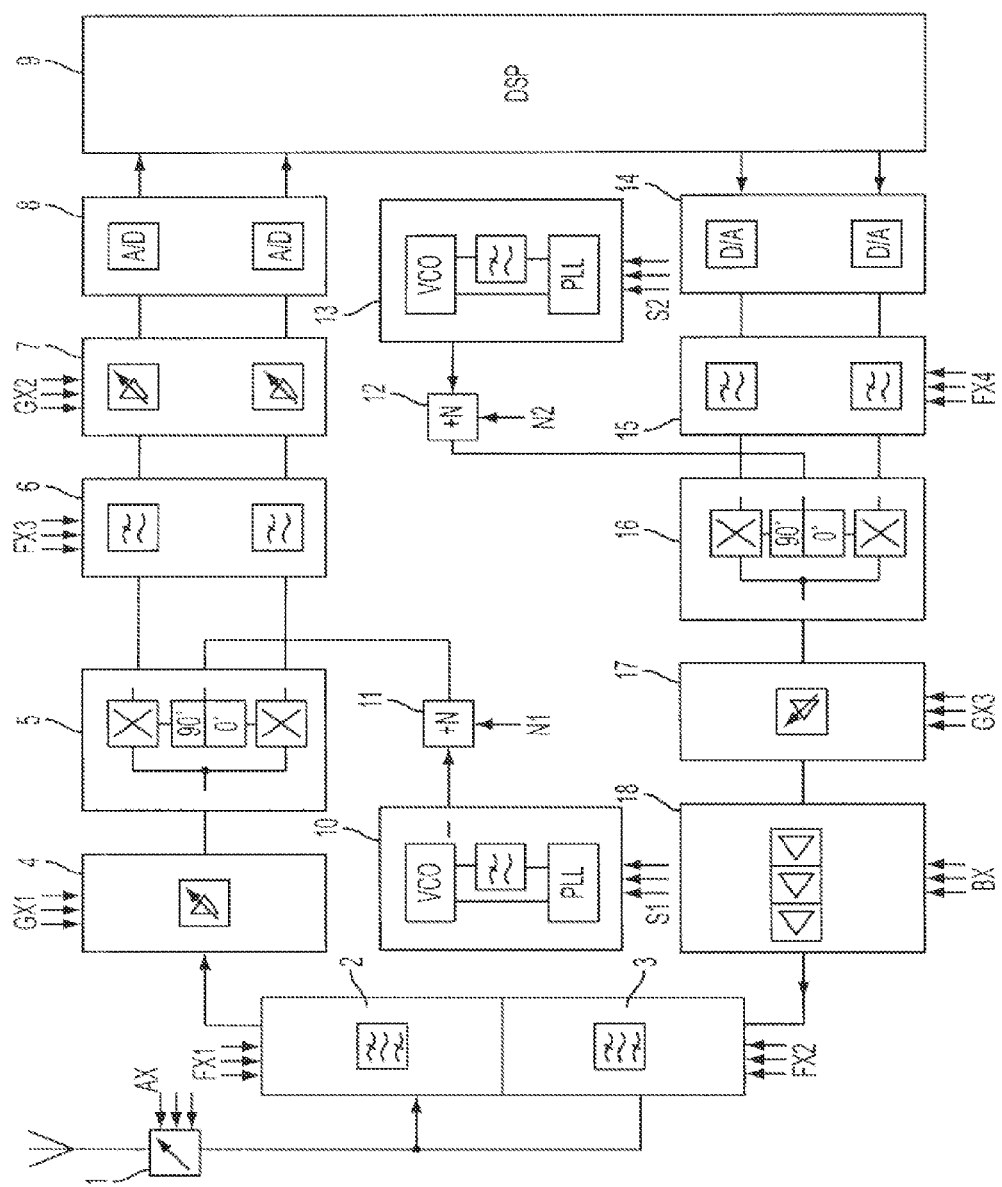

The invention will now be described in more detail with reference to the accompanying drawing wherein FIG. 1 shows a block diagram of a dual-band direct-conversion transceiver according to the prior art, FIG. 2 shows in the form of block diagram a solution according to the invention for a direct-conversion transceiver operating in multiple systems.

FIG. 1 was already discussed in conjunction with the description of the prior art. Next, a transceiver according to the invention will be described, referring to FIG. 2.

FIG. 2 shows in the form of block diagram a transceiver according to the invention. A RF signal received through an antenna is conducted via matching circuits 1 to controllable bandpass filters 2. The matching circuits 1 may advantageously be controllable (AX) with respect to the operating frequency band. A controllable band-pass filter 2 may be advantageously realized using a plurality of bandpass filters so that the RF signal is conducted via switch elements controlled by a control signal FX1 from the matching circuit 1 to the bandpass filter that corresponds to the selected operating frequency band. The bandpass filter may also be realized so as to be adjustable and tuneable by means of programming. The bandpass filtered carrier-frequency signal is further conducted to a low-noise amplifier 4, the gain of which is advantageously controllable. The control signal is marked GX1 in the drawing. In addition to amplifier 4, it is also possible to have integrated amplifiers in connection with the bandpass filters.

The signal is then conducted to a mixer 5 in which the carrier-frequency signal is mixed with an RX mixing signal at the receive frequency to produce a baseband quadrature signal. The RX mixing signal is advantageously generated by a synthesizer 10 the output signal frequency of which is divided by a divider 11 so as to correspond to the selected receive frequency. The synthesizer 10 operates in a similar manner as the synthesizers depicted in FIG. 1. Thus it comprises a voltage-controlled oscillator VCO which produces an output signal. The frequency of the VCO output signal is divided by S1 in a divider in the phase-locked loop PLL. The resulting signal is conducted to a first input of a phase comparator in the phase-locked loop. Similarly, the frequency of a signal generated by a reference oscillator in the phase-locked loop PLL is divided by an integer and conducted to a second input of the phase comparator. The phase comparator produces a signal which is proportional to the phase difference of the two input signals and conducted to a low-pass filter, and the filtered signal then controls the voltage-controlled oscillator VCO. The output frequency is controlled by varying the divisor S1.

The synthesizer output signal is divided in divider 11 by N1 so that the RX mixing signal corresponds to the selected receive frequency band. The output frequency of the synthesizer may be e.g. in the 4-GHz band, so that with 2-GHz systems the synthesizer output frequency is divided by two, and with 1-GHz systems it is divided by four (N1). This way, systems operating in the 1-GHz and 2-GHz bands can be covered with a synthesizer the operating frequency band of which is narrow with respect to the operating frequency.

To produce a quadrature baseband signal the mixer needs two mixing signals with a phase shift of 90 degrees. Phase-shifted components may be produced by a phase shifter in connection with the mixer or they may be produced as quotients generated already in the frequency divider 11, thus achieving an accurate phase difference. Therefore, it is advantageous to use a synthesizer operating frequency which is a multiple of the highest system frequency.

The in-phase component 1 and quadrature component Q from the mixer 5 are further conducted to low-pass filters 6. The higher cut-off frequency of the low-pass filters is advantageously controllable with control signal FX3. Thus the filtering can be performed at a bandwidth corresponding to the selected radio interface, and since the filtering is performed at baseband, it is easy to get the filtering function steep. Also, no strict demands are set on the bandpass filtering (2) of the RF signal.

The baseband signal is further conducted to a gain control block 7 which possibly includes an offset voltage correction block. On the other hand, considering the broad bandwidth of the CDMA system, the offset voltage can easily be removed by high-pass filtering. The amplifier advantageously realizes automatic gain control (AGC). Finally, the signal is convened digital in an analog-to-digital converter 8, and the digital baseband signal is further processed in a digital signal processor (DSP) 9. Channel filtering may also be performed digitally in the DSP, whereby the low-pass filtering of the baseband signal may be performed using a fixed cut-off frequency. Then, however, the dynamics of the analog-to-digital converter must be considerably better.

In the transmitter part, a quadrature baseband signal is first digitally generated in block 9 on the basis of the information signal to be sent. The components of the digital signal are converted analog by digital-to-analog converters 14, whereafter the analog signals are low-pass filtered by low-pass filters 15. Advantageously, the cutoff frequency of the low-pass filters can be controlled with control signal FX4 so as to correspond to the specifications of the selected radio interface.

A TX mixing signal at the carrier frequency is generated by a synthesizer 13 and divider 12. The synthesizer 13 operates in a similar manner as the synthesizer 10 in the receiver pan. Moreover, the synthesizers may share a reference oscillator. The frequency of the synthesizer output signal is controlled with control signal 52 within the synthesizer's operating frequency range. The frequency of the output signal from synthesizer 13 is divided in divider 12 so as to correspond to the selected transmission frequency band. Components phase-shifted by 90 degrees are generated from the TX mixing signal in order to perform complex mixing in mixer 16. The phase-shifted components may be generated in the same way as in the receiver part.

The signal at the carrier frequency is then amplified in an amplifier 17, the gain of which is advantageously controllable in order to set the transmission power and realize automatic gain control (AGC). The control signal is marked GX3 in FIG. 2. The signal is then conducted to a power amplifier 18. The operating frequency band of the power amplifier is advantageously selectable with control signal BX. This can be achieved e.g. such that the amplifier comprises partly separate signal lines for the different operating frequency bands.

The RF signal generated is filtered by a bandpass filter 3. The pass band of the bandpass filter is advantageously controllable with control signal FX2. This can be realized in the same way as in the receiver part. The receiver and transmitter part filters 2 and 3 are advantageously realized in duplex filter pairs for each transmit-receive frequency band associated with a given system. The filters may advantageously be surface acoustic wave (SAW) or bulk acoustic wave (BAW) filters so that several filters with their switches may be attached to one component.

The control signals in the mobile station transceiver according to FIG. 2 are preferably generated in a control block of the mobile station which advantageously comprises a processing unit such as a microprocessor. The control block generates the signal on the basis of a system switch instruction input from the keypad of the mobile station, for example. System selection may be e.g. menu-based so that the desired system is selected by choosing it from a displayed menu by pressing a certain key on the keypad. The control block then generates the control signals that correspond to the selected system. The system switch instruction may also come via the mobile communication system in such a manner that data received from the system may include a system switch instruction on the basis of which the control block performs the system switch. Advantageously, a control program is stored in a memory unit used by the control block, which control program monitors the received data and, as it detects a system switch instruction in the data, gives the central block an instruction to set the control signals into states according to the selection instruction.

The implementation of the blocks described above is not illustrated in more detail as the blocks can be realized on the basis of the information disclosed above, applying the usual know-how of a person skilled in the art.

Above it was described embodiments of the solution according to the invention. Naturally, the principle according to the invention may be modified within the scope of the invention as defined by the claims appended hereto, e.g. as regards implementation details and fields of application. It is especially noteworthy that the solution according to the invention may be well applied to communication systems other than the mobile communication systems mentioned above. Apart from the cellular radio interface proper, the solution may be used to realize e.g. a GPS receiver for the location of a mobile station or other apparatus. Furthermore, the operating frequencies mentioned are given by way of example only, and the implementation of the invention is in no way restricted to them.

It is also noteworthy that the solution according to the invention may be applied to all current coding techniques such as the narrow-band FDMA (Frequency Division Multiple Access) and TDMA (Time Division Multiple Access), as well as the broadband CDMA (Code Division Multiple Access) technique. In addition, the solution according to the invention may be used to realize an FM (Frequency Modulation) receiver.

Below is a table listing some of the so-called second generation mobile communication systems to which the present invention may be applied. The table shows the most important radio interface related characteristics of the systems.

| CELLULAR SYSTEM | AMPS | IS-54/-136 | IS-95 US CDMA | GSM Global System for Mobile Communications | DCS 1800 | PDC Personal Digital Cellular | DECT Digital European Cordless Telephone | PHS Personal Handy Phone System |
|---|---|---|---|---|---|---|---|---|
| RX FREQ. (MHz) | 869-894 | 869-894 | 869-894 | 935-960 | 1805-1880 | 810-826, 1429-1453 | 1880-1900 | 1895-1918 |
| TX FREQ. (MHz) | 824-849 | 824-849 | 824-849 | 890-915 | 1710-1785 | 940-956 1477-1501 | 1880-1900 | 1895-1918 |
| RF BANDWITH | 25 MHz | 25 MHz | 25 MHz | 25 MHz | 75 MHz | 16 MHz 24 MHz | 20 MHz | 23 MHz |
| MULTIPLE ACCESS METHOD | FDMA | TDMA/ FDMA | CDMA/FDMA | TDMA/FDMA | TDMA/ FDMA | TDMA/FDMA | TDMA/ FDMA | TDMA/ FDMA |
| DUPLEX METHOD | FDD | FDD | FDD | FDD | FDD | FDD | TDD | TDD |
| NUMBER OF CHANNELS | 832 | 832, 3 users/ channel | 20, 798 users/ channel | 124, 8 users/channel | 374, 8 users/ channel | 1600, 3 users/ channel | 10, 12 users/ channel | 300, 4 users/ channel |
| CHANNEL SPACING | 30 kHz | 30 kHz | 1250 kHz | 200 kHz | 200 kHz | 25 kHz | 1.728 MHz | 300 kHz |
| MODULATION | FM | π/4DQPSK | QPSK/ OQPSK | GMSK 0.3 Gaussian filter | GMSK 0.3 Gaussian filter | π/4 DQPSK | GFSK 0.3 Gaussian filter | π/4 DQPSK |
| CHANNEL BIT RATE | — | 48.6 kb/s | 1.2288 Mb/s | 270.833 kb/s | 270.833 kb/s | 42 kb/s | 1.152 MB/s | 384 kb/s |

Below is another table listing some of the so-called third generation mobile communication systems to which the present invention may be applied. The table shows the most important radio interface related characteristics of the system.

| CELLULAR SYSTEM | WCDMA | |
|---|---|---|
| RX FREQ. (MHz) | 2110-2170 | 1900-1920 |
| TX FREQ. (MHz) | 1920-1980 | 1900-1920 |
| MULTIPLE ACCESS METHOD | CDMA | TDMA |
| DUPLEX METHOD | FDD | TDD |
| CHANNEL SPACING | 5 MHz | 5 MHz |
| MODULATION | QPSK | |
| CHANNEL BIT RATE | 144 kb/s in rural outdoor, 500 kb/s in urban outdoor and up to 2 Mb/s in indoor | |

The invention claimed is:

1. A direct-conversion transmitter comprising:
a digital signal processor;
a digital-to-analog converter configured to convert a digital baseband quadrature signal to an analog baseband transmission signal;
a transmit synthesizer common to a plurality of radio interfaces of the direct-conversion transmitter and configured to generate a mixing signal;
a controllable low-pass filter common to a plurality of radio interfaces of the direct-conversion transmitter, the controllable low-pass filter configured to perform filtering of the analog baseband transmission signal with a controllable cut-off frequency determined according to which one of the plurality of radio interfaces of the direct-conversion transmitter is selected;
a frequency divider common to the plurality of radio interfaces of the direct-conversion transmitter and configured to divide a frequency of the mixing signal at least by two, wherein the dividing produces two mixing signal components having a 90-degree phase difference;
a controllable gain transmitter amplifier common to the plurality of radio interfaces of the direct-conversion transmitter and configured to amplify a carrier-frequency signal from a mixer of the direct-conversion transmitter at a gain controlled according to which one of the plurality of radio interfaces of the direct-conversion transmitter is selected; and
an antenna,
wherein at least one of the plurality of radio interfaces of the direct-conversion transmitter comprises a modulation, a channel spacing, and a channel bit rate that at least one other of the plurality of radio interfaces does not have.

2. The direct-conversion transmitter of claim 1, wherein the controllable gain transmitter amplifier is configured to perform automatic gain control.

3. The direct-conversion transmitter of claim 1, further comprising:
a bandpass filter configured to filter the carrier-frequency signal amplified by the controllable gain transmitter amplifier, and comprising a selectable pass band set according to which one of the plurality of radio interfaces is selected.

4. The direct-conversion transmitter of claim 1, wherein at least two of the plurality of the radio interfaces have different transmission frequencies.

5. The direct-conversion transmitter of claim 1, wherein a first radio interface of the plurality of radio interfaces employs a time division multiple access method and a second radio interface of the plurality of radio interfaces employs a code division multiple access method.

6. The direct-conversion transmitter of claim 1, further comprising a control block circuit configured to generate at least one control signal that indicates which of the plurality of radio interfaces is selected.

7. The direct-conversion transmitter of claim 6, wherein the control block circuit comprises a processing unit.

8. The direct-conversion transmitter of claim 7, wherein the processing unit is a microprocessor.

9. The method of claim 7, wherein the processing unit is a microprocessor.

10. The direct-conversion transmitter of claim 1, further comprising a power amplifier configured to amplify the carrier-frequency signal amplified by the controllable gain transmitter amplifier and having a controllable operating frequency band set according to which one of the plurality of radio interfaces is selected.

11. The direct-conversion transmitter of claim 1, wherein the direct-conversion transmitter is comprised in a common apparatus with a direct-conversion receiver, the direct-conversion receiver comprising:
a bandpass filter configured to filter a received second carrier-frequency signal;
a first receiver amplifier configured to amplify the received second carrier-frequency signal filtered by the bandpass filter;
a receiver synthesizer configured to generate a receiver mixing signal at a receive frequency;
a receiver mixer configured to generate a complex baseband signal by mixing the receiver mixing signal with the received second carrier-frequency signal amplified by the first receiver amplifier;
a receiver low-pass filter configured to filter the complex baseband signal;
a second receiver amplifier configured to amplify the complex baseband signal filtered by the receiver low-pass filter; and
an analog-to-digital converter configured to generate a receiver digital baseband signal by converting the complex baseband signal amplified by the second receiver amplifier to digital form.

12. The direct-conversion transmitter of claim 1, wherein a first radio interface of the plurality of radio interfaces employs a WCDMA system and a second radio interface of the plurality of radio interfaces employs a Global System for Mobile communications (GSM) system.

13. The direct-conversion transmitter of claim 1, wherein the direct-conversion transmitter is accompanied in a common apparatus by a direct-conversion receiver.

14. The direct-conversion transmitter of claim 1, wherein the direct-conversion transmitter is part of a transceiver that comprises a direct-conversion receiver.

15. The direct-conversion transmitter of claim 1, wherein at least one of the plurality of radio interfaces comprises at least one multiple access method that at least one other of the plurality of radio interfaces does not have.

16. The direct-conversion transmitter of claim 15, wherein the plurality of radio interfaces further differ from each other by at least duplex method.

17. The direct-conversion transmitter of claim 16, wherein the plurality of radio interfaces further differ from each other by at least RF bandwidth.

18. The direct-conversion transmitter of claim 15, wherein the plurality of radio interfaces further differ from each other by at least RF bandwidth.

19. The direct-conversion transmitter of claim 1, wherein the plurality of radio interfaces further differ from each other by at least multiple access method.

20. The direct-conversion transmitter of claim 19, wherein the plurality of radio interfaces further differ from each other by at least duplex method.

21. The direct-conversion transmitter of claim 20, wherein the plurality of radio interfaces further differ from each other by at least RF bandwidth.

22. The direct-conversion transmitter of claim 19, wherein the plurality of radio interfaces further differ from each other by at least RF bandwidth.

23. The direct-conversion transmitter of claim 1, wherein the plurality of radio interfaces further differ from each other by at least duplex method.

24. The direct-conversion transmitter of claim 23, wherein the plurality of radio interfaces further differ from each other by at least RF bandwidth.

25. The direct-conversion transmitter of claim 1, wherein the plurality of radio interfaces further differ from each other by at least RF bandwidth.

26. The direct-conversion transmitter of claim 1, wherein at least two of the plurality of radio interfaces have a common transmission frequency.

27. The direct-conversion transmitter of claim 1, wherein at least two of the plurality of radio interfaces have a common transmission frequency range.

28. The direct-conversion transmitter of claim 1, wherein at least two of the plurality of radio interfaces have at least partially overlapping transmission frequency ranges.

29. The direct-conversion transmitter of claim 1, wherein at least two of the plurality of radio interfaces have transmission frequency ranges that are adjacent to each other.

30. The direct-conversion transmitter of claim 1, wherein at least two of the plurality of radio interfaces have transmission frequency ranges separated by about 41 MHz.

31. The direct-conversion transmitter of claim 1, wherein at least two of the plurality of radio interfaces have transmission frequency ranges separated by about 2 MHz, 20 MHz, 91 MHz, 135 MHz, 419 MHz, 628 MHz, 861 MHz, 964 MHz, 1005 MHz, 1031 MHz, 1046 MHz, 1051 MHz, or 1071 MHz.

32. The direct-conversion transmitter of claim 1, wherein a separation of respective transmission frequency bands of at least two of the plurality of radio interfaces ranges from about 2 MHz to about 1071 MHz.

33. The direct-conversion transmitter of claim 1, wherein the controllable low-pass filter is configured to filter the analog baseband transmission signal through a signal path that is common for each of the plurality of radio interfaces.

34. The direct-conversion transmitter of claim 1, wherein the mixer of the direct-conversion transmitter is common to the plurality of radio interfaces.

35. The direct-conversion transmitter of claim 34, wherein the mixer is configured to produce the carrier-frequency signal based on the two mixing signal components and the analog baseband transmission signal filtered by the controllable low-pass filter.

36. The direct-conversion transmitter of claim 1, wherein the mixer of the direct-conversion transmitter is configured a mix the two mixing signal components and the analog baseband transmission signal filtered by the controllable low-pass filter through a common signal path for the plurality of radio interfaces.

37. A method of using a direct-conversion transmitter comprising:
generating a digital baseband quadrature signal;
converting the digital baseband quadrature signal to an analog baseband transmission signal;
generating a mixing signal using a transmit synthesizer common to a plurality of radio interfaces of the direct-conversion transmitter;
low-pass filtering the analog baseband transmission signal with a controllable cut-off frequency determined according to which one of the plurality of the radio interfaces of the direct-conversion transmitter is selected;
dividing a frequency of the mixing signal at least by two with a frequency divider common to the plurality of radio interfaces of the direct-conversion transmitter, the dividing producing two mixing signal components having a 90-degree phase difference;
and
amplifying a carrier-frequency signal from a mixer of the direct-conversion transmitter using a controllable gain transmitter amplifier common to the plurality of radio interfaces of the direct-conversion transmitter at a gain controlled according to which one of the plurality of radio interfaces of the direct-conversion transmitter is selected; and
transmitting a transmission signal generated from the amplified carrier-frequency signal from an antenna,
wherein at least one of the plurality of radio interfaces of the direct-conversion transmitter comprises a modulation, a channel spacing, and a channel bit rate that at least one other of the plurality of radio interfaces does not have.

38. The direct-conversion transmitter of claim 1, wherein the digital-to-analog converter, the controllable low pass filter, and the controllable gain transmitter amplifier are part of a transmit path common for the plurality of radio interfaces.

39. The direct-conversion transmitter of claim 1, wherein the controllable low pass filter, the mixer, and the controllable gain transmitter amplifier are part of a transmit path common for the plurality of radio interfaces.

40. The direct-conversion transmitter of claim 1, wherein the controllable low pass filter, the mixer, a power amplifier, and the controllable gain transmitter amplifier are part of a transmit path common for the plurality of radio interfaces.

41. The direct-conversion transmitter of claim 1, wherein the controllable low pass filter and the controllable gain transmitter amplifier are part of a transmit path common for the plurality of radio interfaces.

42. The direct-conversion transmitter of claim 1, wherein the controllable low pass filter, the controllable gain transmitter amplifier, and a bandpass filter are part of a transmit path common for the plurality of radio interfaces.

43. The direct-conversion transmitter of claim 1, wherein the controllable low pass filter, the controllable gain transmitter amplifier, a bandpass filter, and a power amplifier are part of a transmit path common for the plurality of radio interfaces.

44. The method of claim 37, wherein the low pass filtering of the analog baseband transmission signal occurs through a signal path that is common for each of the plurality of radio interfaces.

45. The method of claim 44, wherein at least two of the plurality of radio interfaces have different transmission frequencies.

46. The method of claim 44, further comprising:
performing automatic gain control with the controllable gain transmitter amplifier.

47. The method of claim 44, further comprising:
bandpass filtering the carrier-frequency signal amplified by the controllable gain transmitter amplifier using a selectable pass band set according to which one of the plurality of radio interfaces is selected, wherein the transmitting comprises transmitting the bandpass-filtered carrier-frequency signal amplified by the controllable gain transmitter amplifier.

48. The method of claim 44, further comprising:
amplifying the carrier-frequency signal amplified by the controllable gain transmitter amplifier with a power amplifier having a controllable operating frequency band determined according to which one of the plurality of radio interfaces is selected, wherein the transmitting comprises transmitting the carrier-frequency signal amplified by the power amplifier and the controllable gain transmitter amplifier.

49. The method of claim 44, wherein a first radio interface of the plurality of radio interfaces employs a time division multiple access method and a second radio interface of the plurality of radio interfaces employs a code division multiple access method.

50. The method of claim 44, further comprising generating at least one control signal that indicates which of the plurality of radio interfaces is selected.

51. The method of claim 50, further comprising generating the at least one control signal with a processing unit.

52. The method of claim 44, wherein a first radio interface of the plurality of radio interfaces employs a WCDMA system and a second radio interface of the plurality of radio interfaces employs a Global System for Mobile communications (GSM) system.

53. The method of claim 44, further comprising using the direct-conversion transmitter in a common apparatus accompanied by a direct-conversion receiver.

54. The method of claim 44, further comprising using the direct-conversion transmitter as part of a transceiver that comprises a direct-conversion receiver.

55. The method of claim 44, wherein at least two of the plurality of radio interfaces have transmission frequency ranges separated by about 41 MHz.

56. The method of claim 44, wherein at least two of the plurality of radio interfaces have transmission frequency ranges separated by about 2 MHz, 20 MHz, 91 MHz, 135 MHz, 419 MHz, 628 MHz, 861 MHz, 964 MHz, 1005 MHz, 1031 MHz, 1046 MHz, 1051 MHz, or 1071 MHz.

57. The method of claim 44, wherein a separation of respective transmission frequency bands of at least two of the plurality of radio interfaces ranges from about 2 MHz to about 1071 MHz.

58. The method of claim 44, wherein at least one of the plurality of radio interfaces comprises at least one multiple access method that at least one other of the plurality of radio interfaces does not have.

59. The method of claim 58, wherein the plurality of radio interfaces further differ from each other by at least duplex method.

60. The method of claim 59, wherein the plurality of radio interfaces further differ from each other by at least RF bandwidth.

61. The method of claim 58, wherein the plurality of radio interfaces further differ from each other by at least RF bandwidth.

62. The method of claim 44, wherein the plurality of radio interfaces further differ from each other by at least multiple access method.

63. The method of claim 62, wherein the plurality of radio interfaces further differ from each other by at least duplex method.

64. The method of claim 63, wherein the plurality of radio interfaces further differ from each other by at least RF bandwidth.

65. The method of claim 62, wherein the plurality of radio interfaces further differ from each other by at least RF bandwidth.

66. The method of claim 44, wherein the plurality of radio interfaces further differ from each other by at least duplex method.

67. The method of claim 66, wherein the plurality of radio interfaces further differ from each other by at least RF bandwidth.

68. The method of claim 44, wherein the plurality of radio interfaces further differ from each other by at least RF bandwidth.

69. The method of claim 44, wherein at least two of the plurality of radio interfaces have a common transmission frequency.

70. The method of claim 44, wherein at least two of the plurality of radio interfaces have a common transmission frequency range.

71. The method of claim 44, wherein at least two of the plurality of radio interfaces have at least partially overlapping transmission frequency ranges.

72. The method of claim 44, wherein at least two of the plurality of radio interfaces have transmission frequencies that are adjacent to each other.

73. The method of claim 44, further comprising generating the carrier-frequency signal with the mixer, wherein the mixer of the direct-conversion transmitter is common to the plurality of radio interfaces.

74. The method of claim 73, further comprising generating the carrier-frequency signal with the mixer based on the two mixing signal components and the low-pass filtered analog baseband transmission signal.

75. The method of claim 44 further comprising using the mixer to mix the two mixing signal components and the low-pass filtered analog baseband transmission signal through a common signal path for the plurality of radio interfaces.

76. The method of claim 44, wherein the converting, the low-pass filtering, and the amplifying are performed on a transmit path common for the plurality of radio interfaces.

77. The method of claim 44, wherein the low-pass filtering, a mixing to produce the carrier-frequency signal, and the amplifying are performed on a transmit path common for the plurality of radio interfaces.

78. The method of claim 44, wherein the low-pass filtering, a mixing to produce the carrier-frequency signal, the amplifying of the carrier-frequency signal by the controllable gain transmitter amplifier, and an amplifying with a power amplifier of the carrier-frequency signal amplified by the controllable gain transmitter amplifier are performed on a transmit path common for the plurality of radio interfaces.

79. The method of claim 44, wherein the low-pass filtering and the amplifying are performed on a transmit path common for the plurality of radio interfaces.

80. The method of claim 44, wherein the low-pass filtering, the amplifying, and a bandpass filtering of the carrier-frequency signal are performed on a transmit path common for the plurality of radio interfaces.

81. The method of claim 44, wherein the low-pass filtering, the amplifying of the carrier-frequency signal by the controllable gain transmitter amplifier, an amplifying with a power amplifier of the carrier-frequency signal amplified by the controllable gain transmitter amplifier, and a bandpass filtering of the carrier-frequency signal amplified by the power amplifier are performed on a transmit path common for the plurality of radio interfaces.

* * * * *

UNITED STATES PATENT AND TRADEMARK OFFICE
CERTIFICATE OF CORRECTION

PATENT NO. : 8,755,834 B2
APPLICATION NO. : 13/614272
DATED : June 17, 2014
INVENTOR(S) : Risto Väisänen et al.

It is certified that error appears in the above-identified patent and that said Letters Patent is hereby corrected as shown below:

Title Page 3, Column 2, item (56), Other Publications, Line 2:
Please delete "Interntionale" and insert --Internationale--

In the Claims

Column 10, Claim 9, Line 17:
Please delete "claim 7" and insert --claim 1--

Column 13, Claim 45, Line 20:
Please delete "claim 44" and insert --claim 37--

Column 13, Claim 46, Line 23:
Please delete "claim 44" and insert --claim 37--

Column 13, Claim 47, Line 26:
Please delete "claim 44" and insert --claim 37--

Column 13, Claim 48, Line 35:
Please delete "claim 44" and insert --claim 37--

Column 13, Claim 49, Line 45:
Please delete "claim 44" and insert --claim 37--

Column 13, Claim 50, Line 51:
Please delete "claim 44" and insert --claim 37--

Column 13, Claim 52, Line 56:
Please delete "claim 44" and insert --claim 37--

Signed and Sealed this
Thirteenth Day of January, 2015

Michelle K. Lee
*Deputy Director of the United States Patent and Trademark Office*

CERTIFICATE OF CORRECTION (continued)
U.S. Pat. No. 8,755,834 B2

Column 13, Claim 53, Line 61:
    Please delete "claim 44" and insert --claim 37--

Column 13, Claim 54, Line 64:
    Please delete "claim 44" and insert --claim 37--

Column 14, Claim 55, Line 1:
    Please delete "claim 44" and insert --claim 37--

Column 14, Claim 56, Line 4:
    Please delete "claim 44" and insert --claim 37--

Column 14, Claim 57, Line 9:
    Please delete "claim 44" and insert --claim 37--

Column 14, Claim 58, Line 13:
    Please delete "claim 44" and insert --claim 37--

Column 14, Claim 62, Line 27:
    Please delete "claim 44" and insert --claim 37--

Column 14, Claim 66, Line 41:
    Please delete "claim 44" and insert --claim 37--

Column 14, Claim 68, Line 47:
    Please delete "claim 44" and insert --claim 37--

Column 14, Claim 69, Line 50:
    Please delete "claim 44" and insert --claim 37--

Column 14, Claim 70, Line 54:
    Please delete "claim 44" and insert --claim 37--

Column 14, Claim 71, Line 57:
    Please delete "claim 44" and insert --claim 37--

Column 14, Claim 72, Line 60:
    Please delete "claim 44" and insert --claim 37--

Column 14, Claim 73, Line 63:
    Please delete "claim 44" and insert --claim 37--

Column 15, Claim 75, Line 5:
    Please delete "claim 44" and insert --claim 37--

CERTIFICATE OF CORRECTION (continued)
U.S. Pat. No. 8,755,834 B2

Column 15, Claim 76, Line 10:
    Please delete "claim 44" and insert --claim 37--

Column 15, Claim 77, Line 13:
    Please delete "claim 44" and insert --claim 37--

Column 15, Claim 78, Line 17:
    Please delete "claim 44" and insert --claim 37--

Column 16, Claim 79, Line 4:
    Please delete "claim 44" and insert --claim 37--

Column 16, Claim 80, Line 7:
    Please delete "claim 44" and insert --claim 37--

Column 16, Claim 81, Line 11:
    Please delete "claim 44" and insert --claim 37--

UNITED STATES PATENT AND TRADEMARK OFFICE
CERTIFICATE OF CORRECTION

PATENT NO.         : 8,755,834 B2
APPLICATION NO.    : 13/614272
DATED              : June 17, 2014
INVENTOR(S)        : Risto Väisänen et al.

It is certified that error appears in the above-identified patent and that said Letters Patent is hereby corrected as shown below:

Title Page, item (56),
Page 3, Column 2, Line 2, Other Publications:
Delete "Interntionale" and insert --Internationale--

In the Claims
Column 10, line 19, beginning with "9. The method" to the ending of "plurality of radio interfaces." in column 16 line 21:
Delete claims 9-81 and insert the following claims:
--9. The direct-conversion transmitter of claim 1, further comprising a power amplifier configured to amplify the carrier-frequency signal amplified by the controllable gain transmitter amplifier and having a controllable operating frequency band set according to which one of the plurality of radio interfaces is selected.

10. The direct-conversion transmitter of claim 1, wherein the direct-conversion transmitter is comprised in a common apparatus with a direct-conversion receiver, the direct-conversion receiver comprising:
a bandpass filter configured to filter a received second carrier-frequency signal;
a first receiver amplifier configured to amplify the received second carrier-frequency signal filtered by the bandpass filter;
a receiver synthesizer configured to generate a receiver mixing signal at a receive frequency;
a receiver mixer configured to generate a complex baseband signal by mixing the receiver mixing signal with the received second carrier-frequency signal amplified by the first receiver amplifier;

This certificate supersedes the Certificate of Correction issued January 13, 2015.

Signed and Sealed this
Seventeenth Day of March, 2015

Michelle K. Lee
*Director of the United States Patent and Trademark Office* a receiver low-pass filter configured to filter the complex baseband signal;
a second receiver amplifier configured to amplify the complex baseband signal filtered by the receiver low-pass filter; and
an analog-to-digital converter configured to generate a receiver digital baseband signal by converting the complex baseband signal amplified by the second receiver amplifier to digital form.

11. The direct-conversion transmitter of claim 1, wherein a first radio interface of the plurality of radio interfaces employs a WCDMA system and a second radio interface of the plurality of radio interfaces employs a Global System for Mobile communications (GSM) system.

12. The direct-conversion transmitter of claim 1, wherein the direct-conversion transmitter is accompanied in a common apparatus by a direct-conversion receiver.

13. The direct-conversion transmitter of claim 1, wherein the direct-conversion transmitter is part of a transceiver that comprises a direct-conversion receiver.

14. The direct-conversion transmitter of claim 1, wherein at least one of the plurality of radio interfaces comprises at least one multiple access method that at least one other of the plurality of radio interfaces does not have.

15. The direct-conversion transmitter of claim 14, wherein the plurality of radio interfaces further differ from each other by at least duplex method.

16. The direct-conversion transmitter of claim 15, wherein the plurality of radio interfaces further differ from each other by at least RF bandwidth.

17. The direct-conversion transmitter of claim 14, wherein the plurality of radio interfaces further differ from each other by at least RF bandwidth.

18. The direct-conversion transmitter of claim 1, wherein the plurality of radio interfaces further differ from each other by at least multiple access method.

19. The direct-conversion transmitter of claim 18, wherein the plurality of radio interfaces further differ from each other by at least duplex method.

20. The direct-conversion transmitter of claim 19, wherein the plurality of radio interfaces further differ from each other by at least RF bandwidth.

21. The direct-conversion transmitter of claim 18, wherein the plurality of radio interfaces further differ from each other by at least RF bandwidth.

22. The direct-conversion transmitter of claim 1, wherein the plurality of radio interfaces further differ from each other by at least duplex method.

23. The direct-conversion transmitter of claim 22, wherein the plurality of radio interfaces further differ from each other by at least RF bandwidth.

24. The direct-conversion transmitter of claim 1, wherein the plurality of radio interfaces further differ from each other by at least RF bandwidth.

25. The direct-conversion transmitter of claim 1, wherein at least two of the plurality of radio interfaces have a common transmission frequency.

26. The direct-conversion transmitter of claim 1, wherein at least two of the plurality of radio interfaces have a common transmission frequency range.

27. The direct-conversion transmitter of claim 1, wherein at least two of the plurality of radio interfaces have at least partially overlapping transmission frequency ranges.

28. The direct-conversion transmitter of claim 1, wherein at least two of the plurality of radio interfaces have transmission frequency ranges that are adjacent to each other.

29. The direct-conversion transmitter of claim 1, wherein at least two of the plurality of radio interfaces have transmission frequency ranges separated by about 41 MHz.

30. The direct-conversion transmitter of claim 1, wherein at least two of the plurality of radio interfaces have transmission frequency ranges separated by about 2 MHz, 20 MHz, 91 MHz, 135 MHz, 419 MHz, 628 MHz, 861 MHz, 964 MHz, 1005 MHz, 1031 MHz, 1046 MHz, 1051 MHz, or 1071 MHz.

31. The direct-conversion transmitter of claim 1, wherein a separation of respective transmission frequency bands of at least two of the plurality of radio interfaces ranges from about 2 MHz to about 1071 MHz.

32. The direct-conversion transmitter of claim 1, wherein the controllable low-pass filter is configured to filter the analog baseband transmission signal through a signal path that is common for each of the plurality of radio interfaces.

33. The direct-conversion transmitter of claim 1, wherein the mixer of the direct-conversion transmitter is common to the plurality of radio interfaces.

34. The direct-conversion transmitter of claim 33, wherein the mixer is configured to produce the carrier-frequency signal based on the two mixing signal components and the analog baseband transmission signal filtered by the controllable low-pass filter.

35. The direct-conversion transmitter of claim 1, wherein the mixer of the direct-conversion transmitter is configured a mix the two mixing signal components and the analog baseband transmission signal filtered by the controllable low-pass filter through a common signal path for the plurality of radio interfaces.

36. The direct-conversion transmitter of claim 1, wherein the digital-to-analog converter, the controllable low pass filter, and the controllable gain transmitter amplifier are part of a transmit path common for the plurality of radio interfaces.

37. The direct-conversion transmitter of claim 1, wherein the controllable low pass filter, the mixer, and the controllable gain transmitter amplifier are part of a transmit path common for the plurality of radio interfaces.

38. The direct-conversion transmitter of claim 1, wherein the controllable low pass filter, the mixer, a power amplifier, and the controllable gain transmitter amplifier are part of a transmit path common for the plurality of radio interfaces.

39. The direct-conversion transmitter of claim 1, wherein the controllable low pass filter and the controllable gain transmitter amplifier are part of a transmit path common for the plurality of radio interfaces.

40. The direct-conversion transmitter of claim 1, wherein the controllable low pass filter, the controllable gain transmitter amplifier, and a bandpass filter are part of a transmit path common for the plurality of radio interfaces.

41. The direct-conversion transmitter of claim 1, wherein the controllable low pass filter, the controllable gain transmitter amplifier, a bandpass filter, and a power amplifier are part of a transmit path common for the plurality of radio interfaces.

42. A method of using a direct-conversion transmitter comprising:
generating a digital baseband quadrature signal;
converting the digital baseband quadrature signal to an analog baseband transmission signal;
generating a mixing signal using a transmit synthesizer common to a plurality of radio interfaces of the direct-conversion transmitter;
low-pass filtering the analog baseband transmission signal with a controllable cut-off frequency determined according to which one of the plurality of the radio interfaces of the direct-conversion transmitter is selected;
dividing a frequency of the mixing signal at least by two with a frequency divider common to the plurality of radio interfaces of the direct-conversion transmitter, the dividing producing two mixing signal
components having a 90-degree phase difference;
amplifying a carrier-frequency signal from a mixer of the direct-conversion
transmitter using a controllable gain transmitter amplifier common to
the plurality of radio interfaces of the direct-conversion transmitter at a
gain controlled according to which one of the plurality of radio
interfaces of the direct-conversion transmitter is selected; and
transmitting a transmission signal generated from the amplified carrier-
frequency signal from an antenna, wherein at least one of the plurality
of radio interfaces of the direct-conversion transmitter comprises a
modulation, a channel spacing, and a channel bit rate that at least one
other of the plurality of radio interfaces does not have.

43. The method of claim 42, wherein at least two of the plurality of radio interfaces have different transmission frequencies.

44. The method of claim 42, further comprising:
performing automatic gain control with the controllable gain transmitter amplifier.

45. The method of claim 42, further comprising:
bandpass filtering the carrier-frequency signal amplified by the controllable
gain transmitter amplifier using a selectable pass band set according to
which one of the plurality of radio interfaces is selected, wherein the
transmitting comprises transmitting the bandpass-filtered carrier-frequency
signal amplified by the controllable gain transmitter amplifier.

46. The method of claim 42, further comprising:
amplifying the carrier-frequency signal amplified by the controllable gain
transmitter amplifier with a power amplifier having a controllable
operating frequency band determined according to which one of the
plurality of radio interfaces is selected, wherein the transmitting
comprises transmitting the carrier-frequency signal amplified by the
power amplifier and the controllable gain transmitter amplifier.

47. The method of claim 42, wherein a first radio interface of the plurality of radio interfaces employs a time division multiple access method and a second radio interface of the plurality of radio interfaces employs a code division multiple access method.

48. The method of claim 42, further comprising generating at least one control signal that indicates which of the plurality of radio interfaces is selected.

49. The method of claim 48, further comprising generating the at least one control signal with a processing unit.

50. The method of claim 49, wherein the processing unit is a microprocessor.

51. The method of claim 42, wherein a first radio interface of the plurality of radio interfaces employs a WCDMA system and a second radio interface of the plurality of radio interfaces employs a Global System for Mobile communications (GSM) system.

52. The method of claim 42, further comprising using the direct-conversion transmitter in a common apparatus accompanied by a direct-conversion receiver.

53. The method of claim 42, further comprising using the direct-conversion transmitter as part of a transceiver that comprises a direct-conversion receiver.

54. The method of claim 42, wherein at least two of the plurality of radio interfaces have transmission frequency ranges separated by about 41 MHz.

55. The method of claim 42, wherein at least two of the plurality of radio interfaces have transmission frequency ranges separated by about 2 MHz, 20 MHz, 91 MHz, 135 MHz, 419 MHz, 628 MHz, 861 MHz, 964 MHz, 1005 MHz, 1031 MHz, 1046 MHz, 1051 MHz, or 1071 MHz.

56. The method of claim 42, wherein a separation of respective transmission frequency bands of at least two of the plurality of radio interfaces ranges from about 2 MHz to about 1071 MHz.

57. The method of claim 42, wherein at least one of the plurality of radio interfaces comprises at least one multiple access method that at least one other of the plurality of radio interfaces does not have.

58. The method of claim 57, wherein the plurality of radio interfaces further differ from each other by at least duplex method.

59. The method of claim 58, wherein the plurality of radio interfaces further differ from each other by at least RF bandwidth.

60. The method of claim 57, wherein the plurality of radio interfaces further differ from each other by at least RF bandwidth.

61. The method of claim 42, wherein the plurality of radio interfaces further differ from each other by at least multiple access method.

62. The method of claim 61, wherein the plurality of radio interfaces further differ from each other by at least duplex method.

63. The method of claim 62, wherein the plurality of radio interfaces further differ from each other by at least RF bandwidth.

64. The method of claim 61, wherein the plurality of radio interfaces further differ from each other by at least RF bandwidth.

65. The method of claim 42, wherein the plurality of radio interfaces further differ from each other by at least duplex method.

66. The method of claim 65, wherein the plurality of radio interfaces further differ from each other by at least RF bandwidth.

67. The method of claim 42, wherein the plurality of radio interfaces further differ from each other by at least RF bandwidth.

68. The method of claim 42, wherein at least two of the plurality of radio interfaces have a common transmission frequency.

69. The method of claim 42, wherein at least two of the plurality of radio interfaces have a common transmission frequency range.

70. The method of claim 42, wherein at least two of the plurality of radio interfaces have at least partially overlapping transmission frequency ranges.

71. The method of claim 42, wherein at least two of the plurality of radio interfaces have transmission frequencies that are adjacent to each other.

72. The method of claim 42, wherein the low pass filtering of the analog baseband transmission signal occurs through a signal path that is common for each of the plurality of radio interfaces.

73. The method of claim 42, further comprising generating the carrier-frequency signal with the mixer, wherein the mixer of the direct-conversion transmitter is common to the plurality of radio interfaces.

74. The method of claim 73, further comprising generating the carrier-frequency signal with the mixer based on the two mixing signal components and the low-pass filtered analog baseband transmission signal.

75. The method of claim 42, further comprising using the mixer to mix the two mixing signal components and the low-pass filtered analog baseband transmission signal through a common signal path for the plurality of radio interfaces.

76. The method of claim 42, wherein the converting, the low-pass filtering, and the amplifying are performed on a transmit path common for the plurality of radio interfaces.

77. The method of claim 42, wherein the low-pass filtering, a mixing to produce the carrier-frequency signal, and the amplifying are performed on a transmit path common for the plurality of radio interfaces.

78. The method of claim 42, wherein the low-pass filtering, a mixing to produce the carrier-frequency signal, the amplifying of the carrier-frequency signal by the controllable gain transmitter amplifier, and an amplifying with a power amplifier of the carrier-frequency signal amplified by the controllable gain transmitter amplifier are performed on a transmit path common for the plurality of radio interfaces.

79. The method of claim 42, wherein the low-pass filtering and the amplifying are performed on a transmit path common for the plurality of radio interfaces.

80. The method of claim 42, wherein the low-pass filtering, the amplifying, and a bandpass filtering of the carrier-frequency signal are performed on a transmit path common for the plurality of radio interfaces.

81. The method of claim 42, wherein the low-pass filtering, the amplifying of the carrier-frequency signal by the controllable gain transmitter amplifier, an amplifying with a power amplifier of the carrier-frequency signal amplified by the controllable gain transmitter amplifier, and a bandpass filtering of the carrier-frequency signal amplified by the power amplifier are performed on a transmit path common for the plurality of radio interfaces.--